Nov. 24, 1964   P. G. SULZER   3,158,821
OVEN FOR PIEZOELECTRIC CRYSTALS
Filed May 13, 1960   2 Sheets-Sheet 1
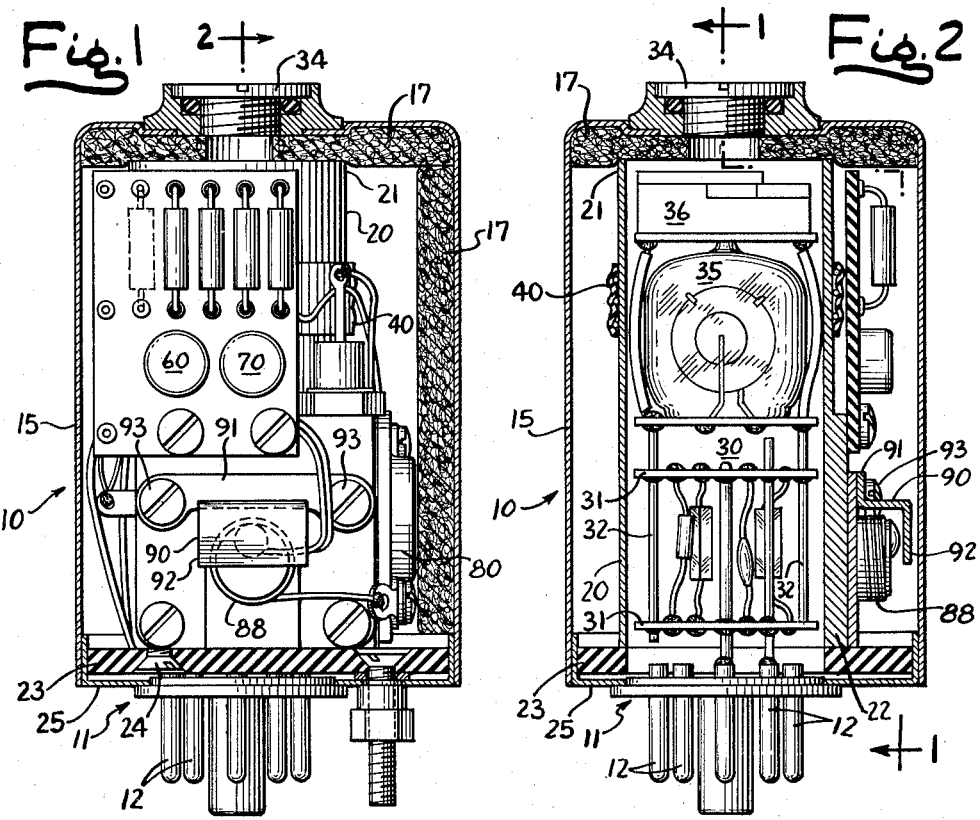
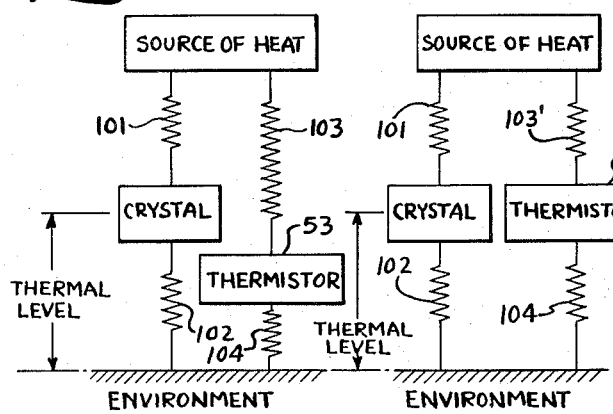
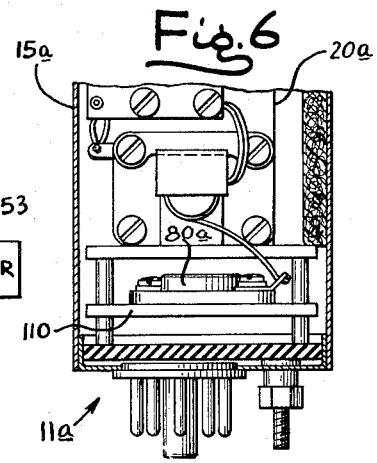
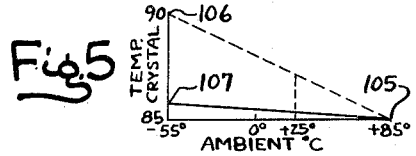
INVENTOR.
PETER G. SULZER
BY Wolfe, Hubbard, Voit + Osann
ATTYS.

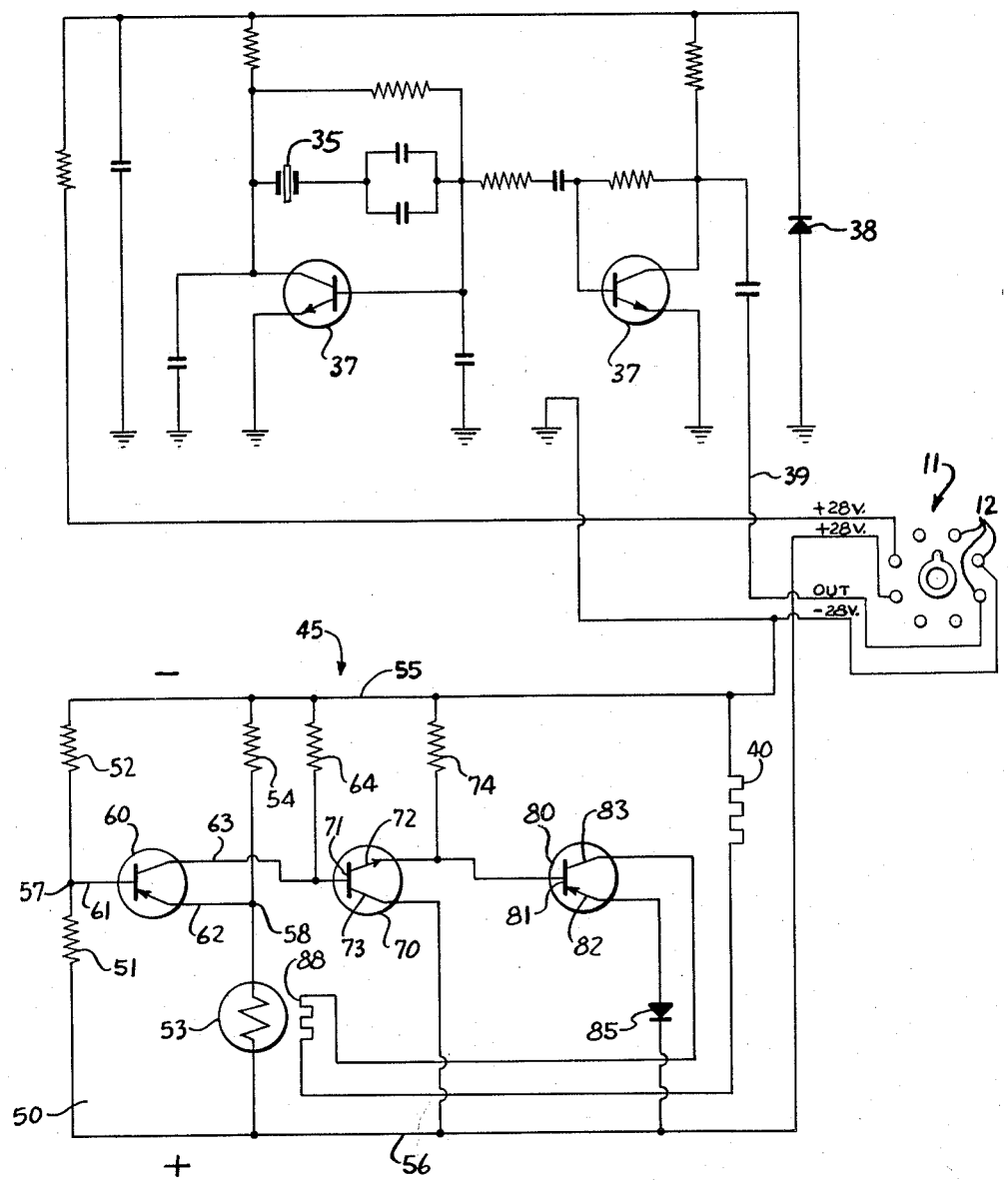

United States Patent Office 3,158,821
Patented Nov. 24, 1964

3,158,821
OVEN FOR PIEZOELECTRIC CRYSTALS
Peter G. Sulzer, Potomac, Md., assignor, by mesne assignments, to The James Knights Company, Sandwich, Ill., a corporation of Delaware
Filed May 13, 1960, Ser. No. 28,949
10 Claims. (Cl. 331—69)

The present invention relates to constant temperature ovens for maintaining the output of a piezoelectric crystal at a precisely constant frequency and more particularly to an improved constant temperature oven having a heater control circuit of the proportional type.

In various frequency control applications, and especially for purposes of reference or measurement, it is desirable to maintain frequency constant with an accuracy measured in parts per million or parts per billion. A conventional crystal oven employs a thermostat closely coupled to the crystal and having contacts for energizing or deenergizing a heater depending upon whether the temperature is below or above the desired control point. Efforts have been made in the past to control the temperature of a crystal by proportional means rather than by a simple "on-off" control but such prior devices have not worked out satisfactorily for a number of reasons. In the first place the prior devices have been unduly complex employing oscillators, tuned amplifiers and similar circuits capable of getting out of adjustment and which require accurately maintained supply voltages. Moreover, efforts to improve the accuracy of the crystal in the face of temperature changes by use of electronic circuitry have been self-defeating because of the effects of temperature changes on the circuitry itself. As a result the prior proportional control devices have been relatively difficult and expensive to produce, and the increase in precision of control has not been sufficiently great or the control itself sufficiently reliable to warrant the increase in expense when compared to prior devices of the "on-off" type.

Accordingly, it is an object of the invention to provide a crystal oven capable of maintaining the frequency of the crystal output with a higher degree of precision than prior devices and in spite of changes in the ambient temperature. It is a related object to provide a crystal oven for precise maintenance of temperature even where the ambient temperature may change suddenly through a wide range, as, for example, encountered in aircraft in going from desert conditions to a high altitude with resulting changes on the order of 60° or 70° C. within a matter of a few minutes without any tendency to overswing or to hunt about the control point.

It is an object to provide a constant temperature oven which employs transistors in the temperature control circuitry but in which the transistors themselves are maintained at the constant temperature, thereby permitting use of low cost transistors of a type having normally poor stability in the face of changes in the operating temperature. It is a more detailed object to provide a transistor control circuit for a crystal oven in which transistors having negative and positive temperature coefficients are employed together so as to still further improve the immunity to changes in the ambient temperature.

It is a further object to provide a crystal oven employing a control circuit of the proportional type having a power transistor for operating the heater and in which the heat from the power transistor is utilized in such a way as to promote and not to interfere with the precise maintenance of temperature.

It is another object of the invention to provide a crystal oven in which the temperature is maintained constant, within approximately 1/10 of a degree C. over an extremely wide swing in ambient temperature, say, from −55° to +85° C., with the maintained temperature lying on a smooth characteristic curve between these two limits free of any kinks or aberrations. Consequently, the present device is capable of meeting the most stringent specifications of the military services as well as the most exacting demands of modern commercial practice.

It is still another object of the present invention to provide an electromechanical design of crystal oven which enables a high degree of consistency from unit to unit and which is capable of being easily tailored or adjusted for use with other specific types of transistors without sacrificing the operating characteristics.

It is a still further object of the present invention to provide a proportional control circuit capable of utilizing poorly regulated direct voltage, for example, 28 volts D.-C., and employing stages of direct coupled amplification while nevertheless being free of the instability problems usually associated with the use of direct coupled amplifiers. Because of the novel use of direct coupled amplifier circuits, an oven control system constructed in accordance with the present teachings may be made extremely simple and compact, requiring a minimum of circuit components. It is another object of the invention to provide a crystal oven which is of simple and straightforward mechanical design providing a maximum degree of symmetry and a minimum number of heat flow paths and which not only insures reproducible characteristics from unit to unit on a production line basis but which simplifies the problem of specific design by keeping the number of variable factors to a minimum.

It is an object of the present invention in one of its aspects to provide an electromechanical construction in which the crystal and the heat detector are maintained at substantially the same temperature level relative to the heat source and the outer environment respectively, thereby to minimize the effect of changes in environment on the maintained control point. It is a related object to provide an oven having a relatively low power dissipation even at the lowest end of the ambient range but which, nevertheless, has an intentionally high heat loss for more instantaneous response to changes in ambient conditions. In this connection it is an object to provide a crystal oven having a bridge input circuit passing a relatively high bridge current in order to provide stable or "stiff" operating characteristics in the face of the loading effect of the connected circuitry but in which the heat dissipated in the bridge circuit has little or no effect upon the accuracy of control even at the high end of the ambient range.

Finally it is an object of the present invention to provide a crystal oven of the proportionally controlled type which is simple and inexpensive to manufacture, using non-critical parts, which requires no maintenance or adjustment and which has a useful life far exceeding that of thermostatically controlled ovens.

Other objects and advantages of the invention will become apparent upon reading the attached detailed description and upon reference to the drawings in which:

FIGURE 1 is an elevational view of an oven constructed in accordance with the present invention with the front surface of the housing removed along line 1—1 in FIG. 2 to show the internal construction.

FIG. 2 is a transverse section taken along the line 2—2 in FIG. 1.

FIG. 3 is a schematic diagram of a proportional temperature control circuit arranged in accordance with the present invention together with a schematic diagram of the crystal controlled oscillator whose environment is to be controlled.

FIG. 4a is a schematic showing the paths of the heat flow under certain conditions.

FIG. 4b is similar to FIG. 4a but shows the paths of heat flow in the present device.

FIG. 5 is a temperature characteristic typical of an oven constructed in accordance with the present invention.

FIG. 6 is a fragmentary section showing an alternative mounting for the power transistor.

While the invention has been described in connection with a preferred embodiment it will be understood that we do not intend to limit the invention to the embodiment shown but intended to cover the alternative and equivalent arrangements included within the spirit and scope of the appended claims.

Turning now to the drawings, FIGS. 1 and 2 show a preferred form of crystal oven 10 having a base 11 providing a set of contacts 12 which may be in the conventional octal arrangement. Surrounding the elements to be described is a housing 15 which is secured to the base 11 at its lower end lined with a layer of insulation 17.

While the purpose of the device is to provide a constant temperature environment for a piezoelectric crystal, in its present form the device includes an oscillator circuit associated with the crystal for producing an output signal having an accurately maintained frequency. A typical device constructed in accordance with the present invention, little larger than a vacuum tube, is capable of producing an output signal accurate to within a few parts in one hundred million. Conseqeuntly, the present device is ideally suited for use as a frequency standard or for exciting other electronic equipment for communications purposes or the like wherever a high order of accuracy must be maintained under conditions of widely varying ambient temperature.

Extending upwardly from the base 11 is a cylindrical anvil 20 machined of aluminum or other good conducting metal having an upper end 21 and a lower end 22. For securing the anvil in place, it is preferably seated on a plastic wafer 23 to which it is secured by machine screws 24, only one of which is shown. The wafer, in turn, is recessed within a metallic cup 25 fitted within the lower end of the housing 15.

Telescoped within the anvil 20 is a crystal oscillator assembly 30 including a frame which may be made up of a number of wafers 31 supported on posts 32 and mounting a glass enclosed crystal 35 at its upper end. At the top of the assembly is a trimmer capacitor 36 to which access may be had by removing a plug 34 which is screwed into the top of the housing 15. The circuit of the oscillator assembly 30 is set forth schematically in FIG. 3. Such circuitry is not per se a part of the present invention. It will suffice to say that the circuit includes transistors 37, and a diode 38, with an output line 39 carrying the output signal to one of the terminal prongs at the bottom of the assembly.

For the purpose of supplying heat to the anvil a main heating element 40 is provided which is wound about the anvil 20 at the upper end 21 thereof and in a position directly opposite the crystal 35. The remainder of the discussion will be directed primarily toward the temperature controlling arrangement indicated at 45 in FIG. 3 which includes means for sensing the temperature of the anvil and for applying current to the heating element 40 so that the temperature of the anvil is correctively maintained in spite of the changes in ambient temperature.

Thus, in accordance with one of the aspects of the present invention a bridge circuit is provided connected to a source of direct voltage having a temperature responsive resistor in one of its legs for producing a direct voltage output signal in accordance with changes in temperature. Further in accordance with the invention output terminals are directly connected to the input terminals of a transistor so that the output of the transistor is substantially independent of variations in the voltage source. Thus, in the present embodiment the bridge indicated at 50 is made up of resistors 51, 52, 53 and 54, with the resistor 53 preferably being in the form of a thermistor having a high negative temperature coefficient of resistance. Current is supplied to the bridge via a negative bus 55 and a positive bus 56 fed by a conventional voltage source of approximately 28 volts. Connected across the output terminals 57, 58 of the bridge is a first transistor 60 having a base 61, an emitter 62 and a collector 63 with the base being connected to the terminal 57 and the emitter to the terminal 58. A load resistor 64 is in series with the collector. Since, upon any changes in the voltage between the bus 55 and bus 56, the output terminals 57, 58 will tend to vary in unison with one another, the transistor 60 will be substantially independent of variations of voltage supply and the output current will be a function solely of the resistance of the temperature responsive resistor 53.

Directly coupled to the output circuit of the transistor 60 for producing further amplification is a second transistor 70 having a base 71, an emitter 72 and a collector 73 connected as shown with a load resistor 74 in series with the emitter. Preferably the transistor 60 is of the PNP germanium type while the transistor 70 is of the NPN silicon type. Thus the transistor 70 not only maintains the sense of the output signal from the transistor 60 but tends to compensate for any minor changes in temperature which may affect the two transistors.

Directly coupled to the output of the transistor 70 is a power transistor 80 having a base 81, an emitter 82 and a collector 83, the latter being in series with the heater 40. For the purpose of controlling the current which flows through the output circuit of the power transistor for a given value of input voltage, a voltage reference in the form of a zener diode 85 is connected in series with the emitter 82. Such diode has a constant voltage drop which may be on the order of 5.6 volts.

In accordance with the present invention means are provided for applying a portion of the output of the power transistor 80 directly to the thermistor 53 so that any tendency toward overshooting of the control circuit is eliminated and so that the temperature responsive resistor is maintained more nearly at the thermal level of the crystal relative to the source of the heat. Thus, in the preferred embodiment, an auxiliary heater 88 is employed arranged in series with the heater 40 in the output circuit of the power transistor and wound about the thermistor 53. Further in accordance with the invention the thermistor is additionally coupled to the anvil by means of a shunt made of copper or other good conducting metal which is secured to the anvil by screws or the like in good conducting relation and which overhangs the thermistor for conducting heat to it. The shunt, indicated at 90 in FIGS. 1 and 2, has a base portion 91 and an overhanging or lip portion 92 with the unit being secured to the base of the thermistor by means of screws 93.

The importance of the auxiliary heater 88 and the shunt 90 in the precise control of the temperature of the crystal may be made apparent upon consideration of the diagrams in FIGS. 4a and 4b, respectively. Absent the auxiliary heater 88 and shunt 90, the thermal levels of the crystal and thermistor may be graphically indicated as in FIG. 4a where the heat flow paths are indicated by resistances and where the length of the resistance indicates, roughly, the resistance to heat flow. Conveniently, the source of heat may be thought of as a potential and the heat itself as current flow to the outside environment. Thus, the resistance of the flow of heat from the source to the crystal is indicated at 101 and the resistance to the flow of heat from the crystal to the environment is indicated at 102. The ratio of the two resistances establishes a certain "thermal level" for the crystal. The resistance to flow of heat from the source to the thermistor is indicated at 103 and the resistance to flow of heat from the thermistor to the environment is indicated at 104. Because of the fact that the thermistor is located at the base of the anvil and thus adjacent the environment, the resistances 103, 104 will have a different ratio with respect to one another than the ratio of resistors 101, 102 so that the thermistor will occupy a different thermal level. The significance of the difference in thermal level may be appreciated by referring to the response curve in FIG. 5 which shows the temperature of the crystal as a function of the ambient temperature. When the control point of the temperature control system is at, say, 85° C. and when the ambient temperature is at a level which is the same as the control point, the thermistor no longer calls for heat and the heater is turned off so that the temperature of the crystal becomes the same as the ambient. When the ambient temperature drops to −55° C. the thermistor 53, being relatively closely coupled to the environment, continues to call for heat until its temperature is raised by the heater 40 to the control point of 85°. However, the crystal under such circumstances will be at a temperature above 85° C. since it is closer to the source of heat and more distant from the environment, i.e., at a higher "thermal level." Thus, under low temperature ambient conditions the temperature at which the crystal is maintained may be as much as five degrees higher than the control point as indicated at 106.

It would be possible to raise the thermal level of the temperature responsive resistor by increasing the resistance 104 to the flow of heat which might be brought about, for example, by interposing insulation between the thermistor and the environment. However, this is undesirable since for rapid response of the system a relatively high loss heat path should be provided. However, in carrying out the invention the thermal resistance between the source of heat and the thermistor is effectively reduced from a value 103 in FIG. 4a to a value 103' shown in FIG. 4b. This raises the thermal level of the thermistor to approximately that of the crystal so that both the crystal and the thermistor are acted upon proportionally to the same extent by the source of heat and by the external environment. Stated in other words, under a given low ambient condition the leakage of heat from the crystal and the thermistor are approximately the same. Thus, when the thermistor is at the control point the temperature of the crystal is very close to the control point, on the order of 1/10 of a degree C., as indicated at 107. In short, it has been found that the use of the auxiliary heater plus the use of the shunt enables exact maintenance of the crystal temperature over the entire ambient range. Moreover, the transistors in the heater circuit are similarly maintained within precisely accurate temperature limits so that their electrical characteristics tend to remain constant. This makes it possible to employ direct-coupled amplifier stages with a high degree of stability and makes it possible to employ low cost transistors of the germanium type which are subject to substantial changes in their operating characteristics with changes in temperature and which, for that reason, are usually avoided in highly critical control circuits.

While the operation of the circuit will be apparent to one skilled in the art, based upon the above description, it may be helpful to summarize it briefly. Let it be assumed, for example, that the temperature is below the control point. Under such conditions the resistance of the thermistor 53 will be on the high side of the control point, so that terminal 58 of the bridge is negative with respect to the terminal 57. This biases the transistor 60, which is type PNP, reversely so that little or no current flow takes place through the load resistor 64. This causes the base of the transistor 70 to become negative with respect to the emitter. Since this transistor is type NPN, substantially no current flows through the load resistor 74. Under such conditions the base of the power transistor 80 is negative, biasing the transistor in the forward direction so that current flows through the heater winding 40 and the auxiliary heater 88. In order to control the amount of current which flows under given input signal conditions, a zener diode 85 is chosen having a desired voltage drop, a matter within the skill of the art. In any event the heat liberated at the heater 40 raises the temperature of the anvil and, hence, the temperature of the crystal. Since the anvil is made of aluminum or other good conducting metal the rise in temperature occurs immediately. The temperature of the thermistor 53 is also raised, both because of the coupling to the anvil and because of the heat directly transmitted to the thermistor via the auxiliary heater 88. This increase in temperature results in a reduction in the resistance of the thermistor so that the amount of heat liberated at the heaters 40 and 88 is modulated downwardly to a value just sufficient to achieve equilibrium. In the event that the thermistor temperature tends to go above the control point, the action of the circuit is in the opposite sense. First of all the drop in resistance of the thermistor 53 biases the first transistor 60 forwardly, producing current flow in the load resistor 64. This swings the base of the transistor 70 slightly positive with respect to the ammeter, producing a condition of forward bias and increasing current flow in the second load resistor 74. The effect of this is to swing the base of the transistor 80 in the positive direction, reducing the forward bias and reducing the flow of current in the collector circuit. The over-all effect is to liberate heat directly in proportion to the call for heat from the thermistor resulting in a much finer degree of control than would be possible in "on-off" type of control circuit.

Since the transistors are all within the housing and coupled to the anvil they operate at a constant temperature with a response characteristic that does not vary so that the device operates accurately and consistently regardless of the ambient temperature and, without adjustment, over a life which is, for practical purposes, unlimited. Precision of control is achieved using standard, non-critical components and, because of the simplicity of the arrangement, the unit may be constructed at low cost. Moreover, it is found that the unit may be manufactured on a production line basis with a high degree of consistency from unit to unit.

It is one of the more detailed features of the present invention that the heat generated by the power transistor 80, particularly under conditions of cut-off or near cut-off, is utilized in such a way that it does not interfere with the action of the main heating element 40 but is, on the contrary, usefully employed to counteract heat loss from the housing to the surrounding environment. Thus, it will be understood by one skilled in the art that during those times that the main heater winding 40 is energized very little heat loss occurs in the power transistor. However, under conditions of cut-off or near cut-off when the thermistor is not calling for heat, the heat given off by the power transistor is, nevertheless, at a level which might produce an unwanted rise in the temperature of the oven, particularly when the oven is operated under high ambient temperature conditions. Accordingly, in carrying out the invention the power transistor is located near the bottom end of the anvil, i.e., where the heat loss to the environment is maximum. It is found in practice that the heat which is generated by the power transistor serves to heat the interior of the housing, compensating for heat loss from the housing to the environment and thereby contributing to the stability of operation. Since the power transistor is only loosely coupled to the crystal, whereas the main heater winding 40 is closely coupled to the crystal, and since the main heater has a much greater thermal output, it predominates in maintaining the crystal at the desired operating temperature even under high ambient conditions.

If desired, and in accordance with one of the detailed aspects of the invention, the power transistor 80 may be further uncoupled from the crystal by mounting it within the housing but out of physical contact with the anvil. Moreover, if desired, the power transistor 80 may be provided with a separate heat sink centered under the anvil so that the heat therefrom is free to flow upwardly along the walls of the housing thereby to compensate more symmetrically for the normal loss of heat from the housing. Such an arrangement is shown in FIG. 6 which is a fragmentary cross section of a modified oven in which the power transistor, indicated at 80a, is mounted on a separate heat sink 110 with the anvil 20a being upraised within the housing 15a to provide the necessary clearance. Where the embodiment of FIG. 6 is used, the bottom end of the anvil is blocked by the transistor 80a so that the crystal oscillator assembly is telescoped into the anvil from the top rather than from the bottom.

Because of the fact that the paths of heat flow are well defined in the present construction, it will be apparent that the teachings may be readily extended by one skilled in the art to ovens of different specific construction but of analogous design.

I claim as my invention:

1. In a crystal oven the combination comprising a housing, a hollow cylindrical anvil of thermally conductive metal centered in said housing, a main heating element wound about said anvil, means for mounting a crystal in said anvil, temperature sensing means having close thermal coupling with the outer surface of said anvil and producing an output signal in accordance with the temperature on the anvil, means including a transistor amplifier associated with the temperature sensing means and a power transistor for controlling said heating element in accordance with the output signal to correctively maintain the temperature of said anvil, and a crystal oscillator assembly telescoped within said anvil including a piezoelectric crystal and an oscillator circuit including at least one transistor, the transistors all being thermally coupled to the outer surface of said anvil for operation at a substantially constant temperature and said power transistor being located in said housing so that the heat therefrom tends to counteract loss of heat from the housing to the environment.

2. In a crystal oven the combination comprising a housing, an anvil of thermally conductive material in said housing and having provision for mounting a crystal therein so that the temperature closely follows that of the anvil, a heating element surrounding the anvil for heating the same, a temperature sensing device thermally coupled to the anvil at a point spaced from the outer surface of said heating element for producing a signal which varies with the temperature of the anvil, means including an amplifier associated with the sensing device and responsive to the signal therefrom, said amplifier having transistors including an output transistor of the power type with the heating element connected in its output circuit for controlling the heating element in accordance with the signal to correctively change the temperature of the anvil, the transistors being located in the housing and said power type transistor being arranged at the base of the anvil so that the heat from the latter is released within the housing, and an auxiliary heating element connected to the output of the power type transistor and thermally coupled to the temperature sensing device.

3. In a crystal oven the combination comprising a housing having a base, a hollow cylindrical anvil of thermally conductive metal in said housing seated on said base, means for mounting a crystal in the upper portion of the anvil, a main heating element wound about the upper portion of said anvil, temperature sensing means at the base end of said anvil and producing an output signal in accordance with the temperature of the anvil, means including a transistorized amplifier associated with the temperature sensing means and responsive to the output signal produced thereby, said transistorized amplifier having a power transistor feeding said heating element for controlling said heating element in accordance with the output signal to correctively maintain the temperature of the anvil, and an auxiliary heating element electrically coupled to the main heating element for applying heat directly to the temperature sensing means, said transistors being located in said housing with the power transistor adjacent the base end of said anvil so that the heat generated by the power transistor particularly under conditions of cut-off tends to counteract loss of heat from the housing to the environment.

4. In a crystal oven the combination comprising a housing, an anvil of thermally conductive material in said housing having provision for mounting a crystal therein so that the temperature closely follows that of the anvil, a heating element thermally coupled to the anvil for heating the same, a temperature sensing device having close thermal coupling to the outer surface of said anvil for producing a direct voltage signal which varies with the temperature of the anvil, means including a direct coupled amplifier associated with the sensing device, and responsive to the signal produced thereby, said amplifier comprising transistors including an output transistor of the power type having the heating element connected in its output circuit for controlling the heating element in accordance with the direct voltage signal to correctively change the temperature of the anvil, said transistors being located in said housing and thermally coupled to the outer surface of said anvil so that they are maintained at a substantially constant operating temperature, and an auxiliary heating element electrically in series with the main heating element and having close thermal coupling with the temperature sensing device.

5. In a crystal oven the combination comprising an anvil of thermally conductive material having provision for mounting a crystal in close thermal coupling therewith, a main heating element surrounding the anvil, a bridge circuit having input and output terminals with a source of direct voltage connected to the input terminals and including a temperature responsive resistor in one leg having close thermal coupling to the outer surface of said anvil, a first transistor having its input circuit connected across the output terminals of the bridge to produce a direct output signal in accordance with the bridge unbalance resulting from a change in the temperature of the anvil, a second transistor having its input circuit directly coupled to the output circuit of the first transistor, and a power transistor having its input direct coupled to the output of the second transistor and having a Zener diode in series therewith to provide a reference voltage, said power transistor having said heating element connected in its output circuit for controlling said heating element in accordance with the direct output signal to correctively change the temperature of the anvil, said transistors and said zener diode all being in close thermal relation with respect to the outer surface of said anvil for operation at a substantially constant temperature, and means for providing thermal conduction between said heating element and said temperature responsive resistor.

6. In a crystal oven the combination comprising an anvil of thermally conductive material having provision for mounting a crystal in close thermal coupling therewith, a heating element surrounding the anvil, a bridge circuit having input and output terminals with a source of direct voltage connected to the input terminals and including a temperature responsive resistor in one leg having close thermal coupling to the outer surface of said anvil, a transistor having its input circuit connected across the output terminals of the bridge so that the output thereof corresponds to the anvil temperature and is substantially independent of variations in the source of direct voltage, a power transistor having its input coupled to the output of the said transistor, said power transistor having said heating element connected in its output circuit for controlling said heating element in accordance with said transistor output to correctively change the temperature of the anvil, and means including a source of reference voltage connected to the power transistor for establishing a desired output level thereof, said transistors being thermally coupled to the outer surface of said anvil for operation at a substantially constant temperature.

7. In a crystal oven the combination comprising an anvil of thermally conductive material having provision for mounting a crystal in close thermal coupling therewith, a main heating element surrounding the anvil for heating the same, a bridge circuit having input and output terminals with a source of direct voltage connected to the input terminals and including a thermistor in one of its legs having close thermal coupling to the outer surface of said anvil, an input transistor having its input circuit connected directly across said output terminals for providing an output corresponding to the anvil temperature, means including a power transistor having its input circuit coupled to the second transistor and having interposed in its output circuit a reference voltage device having the characteristics of a zener diode, said heating element being connected in the output circuit of the power transistor so that the heating element is correctively energized in accordance with the anvil temperature for maintenance of a constant temperature in said anvil, and an auxiliary heater in the output circuit of said power transistor and adjacent said thermistor to provide anticipatory action and to effectively couple said thermistor more closely to the source of heat so that the thermistor is coupled to said source of heat to more nearly the same degree as the crystal.

8. In a crystal oven the combination comprising a hollow cylindrical anvil of metal having good thermal conduction characteristics and having an upper end and a base end, means for mounting a crystal centered within the upper end of the anvil, a main heater winding wound about the upper end of the anvil, a bridge circuit having input and output terminals with a source of direct voltage connected to the input terminals and including a temperature responsive resistor in one leg thermally coupled to the base end of the anvil, a direct coupled transistor amplifier having transistors and connected to the output terminals of the bridge circuit and having its output connected to the heater winding for controlling said heater winding to correctively change the temperature of the anvil, the output of said transistor amplifier corresponding to the anvil temperature, said transistors being thermally coupled to the outer surface of said anvil for operation at a substantially constant temperature, and an auxiliary heating element coupled to the output of the transistor amplifier and associated with the temperature responsive resistor for providing anticipatory effect and freedom from overshoot while at the same time raising the thermal level of the temperature responsive resistor so that it more nearly approaches the thermal level of the crystal.

9. In a crystal oven the combination comprising an outer housing, a hollow cylindrical inner housing constructed of thermally conductive material mounted within the outer housing, a crystal oscillator assembly telescoped within the inner housing, a main heating element wound about the inner housing adjacent the crystal oscillator, temperature sensing means thermally coupled to the outer surface of the inner housing for producing an output signal in accordance with the temperature of the inner housing, and a transistorized amplifier including a power transistor responsive to the output signal for applying power to the main heating element in accordance with the amplitude of the output signal so that the temperature of the anvil is correctively changed, said transistorized amplifier being thermally coupled to the outer surface of the inner housing so that the transistors therein are maintained at a substantially constant temperature.

10. In a crystal oven the combination comprising an anvil of thermally conductive material, a crystal oscillator assembly telescoped within the anvil, a main heating element wound about the anvil adjacent the crystal oscillator, means including a temperature sensing device thermally coupled to the outer surface of the anvil for producing an output signal in accordance with the temperature of the anvil, a transistorized amplifier including a plurality of direct coupled transistor stages responsive to the output signal for applying power to the main heating element in accordance with the amplitude of the output signal to correctively change the anvil temperature, and means electrically associated with the transistorized amplifier and thermally associated with the anvil for raising the thermal level of the temperature sensing device to the same proportional thermal level as the crystal oscillator, the transistorized amplifier being thermally coupled to the outer surface of the anvil for maintaining the transistors therein at a substantially constant temperature free from changes in the ambient temperature in which the oven is employed.

References Cited in the file of this patent
UNITED STATES PATENTS

| | | |
|---|---|---|
| 2,920,175 | Keen et al. | Jan. 5, 1960 |
| 2,967,924 | Friend | Jan. 10, 1961 |
| 2,973,420 | Craiglow et al. | Feb. 28, 1961 |
| 3,007,023 | Johnston et al. | Oct. 31, 1961 |
| 3,028,473 | Dyer et al. | Apr. 3, 1962 |